Oct. 22, 1946.  A. G. OSBORNE  2,409,788
METHOD FOR APPLYING CLOSURES TO CONTAINERS
Filed Oct. 21, 1942    2 Sheets-Sheet 1

INVENTOR
Andrew G. Osborne
BY
ATTORNEY

INVENTOR
Andrew G. Osborne

Patented Oct. 22, 1946

2,409,788

UNITED STATES PATENT OFFICE 2,409,788

METHOD FOR APPLYING CLOSURES TO CONTAINERS

Andrew G. Osborne, New Kensington, Pa., assignor to Aluminum Company of America, Pittsburgh, Pa., a corporation of Pennsylvania Application October 21, 1942, Serial No. 462,826

3 Claims. (Cl. 226—87)

This invention relates to a method for applying closures to containers and more particularly to a method for reforming metal closure blanks and the sealing liners thereof to threaded containers, especially those of glass.

In closures for containers, seals are made by pressing a sealing material against one or more sealing surfaces on the container within the closure. Compressible or plastically deformable sealing materials such as cork or soft rubber are, of course, desirable for this purpose but because these materials are not always readily available or are relatively expensive, the use of less compressible sealing materials such as paper, pulp board or the like sometimes becomes a practical necessity. These relatively incompressible materials must be pressed with considerable force into intimate contact with the sealing surfaces of the container and there held by an unyielding force to insure tight positive sealing. Furthermore, with such materials, a greater area of contact between the liner and the sealing surfaces of the container is desirable than that required for easily compressible sealing materials.

In machines belonging to the general class to which the present apparatus relates, an occasional breakage of the glass containers occurs during the sealing operation. This is principally due to the contact of thread-forming elements with the bare glass of the containers to which no closure blanks have been applied. Although much has been done to alleviate this by improving the cap delivery mechanism, absolute reliability in performance of the delivery mechanism is generally unobtainable. It is, therefore, desirable to provide other means, preferably in association with the sealing head, to minimize breakage of containers in the aforementioned manner.

It is an object of the present invention to provide a method of reforming metallic closure blanks on containers to produce a seal on a plurality of container sealing surfaces. It is another object of the invention to provide a method of producing a tight positive seal between the sealing surfaces of containers and closure liners of paper, pulp board, news board and other similar materials which are relatively incompressible as compared with soft rubber, cork, etc. Further objects and advantages will be apparent from the following description.

According to my invention a seal is formed between the closure liner and a plurality of sealing surfaces on a container by placing a plain skirted metallic closure blank having a suitable liner on the container and then reforming the edge of the liner and the section of the metal blank adjacent thereto around at least the top and side of the open end of the container finish by the application of pressure to the top of the blank. When the seal has been formed in this manner and while the pressure is still being applied, the closure blank is secured to the container by spinning threads in the skirt to conform to the threads disposed externally on the container finish. As employed throughout the specification and appended claims, container finish refers to the portions of the container embraced by a closure, and "sealing surface" refers to that portion of the container finish contacted by the liner.

In practicing my invention, a cup-like blank is provided comprising a one-piece body having a closed end and a continuous unthreaded depending skirt, the lower end of which is preferably finished with an annular wire edge or like construction to give reinforcement thereto. In the skirt adjacent the closed end of the blank, an annular channel or bulge, the diameter of which is somewhat larger than the diameter of the skirt, is provided to receive and hold a liner and to furnish sufficient metal for the formation of an annular reinforcing rib during the sealing operation. The liner which may be either a disc or a ring is fitted snugly into the channel and is somewhat larger than the top of the container defining the opening. The annular channel and the oversized liner fitted therein are essential in the present method to the formation and to the retention of a seal on the side sealing surfaces of the container finish, particularly with the aforementioned relatively incompressible sealing materials. During the sealing operation the liner in the closure blank is reformed by drawing the edge of the liner downwardly around the outside of the container mouth. The incompressible materials, being relatively stiff, tend to pull away from the side of the container. To prevent any substantial retraction of the liner from the side of the container, an annular rib is formed in the closure near the lower edge of the liner during the reforming operation, to give lateral support to the metal of the closure retaining the liner in the reformed position. As a result of this operation, the skirt is extended further down the container, preferably until the wire edge of the skirt is forced against a continuous bead on the container. When the closure is in this position, threads are spun in the skirt to correspond to the threads disposed on the container finish.

Figure 1:
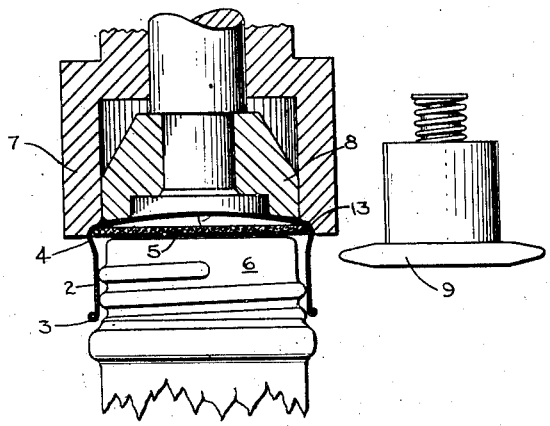
Fig. 1 is a vertical cross sectional view of a closure blank and pressure block, the container on which the blank is to be reformed and a thread-forming roller being shown in elevation.
Figure 2:
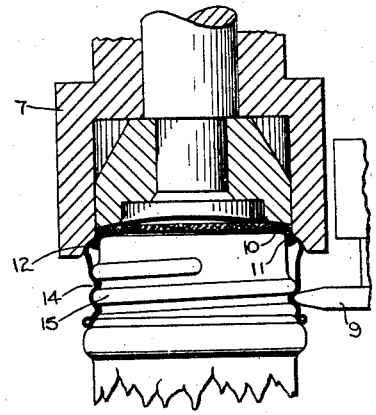
Fig. 2 is a view similar to Fig. 1 showing the closure after application with the pressure block and thread-forming roller still in contact with the closure.

Referring now to the drawings, particularly Fig. 1, a blank having a dome-shaped end 1, depending skirt 2, wire edge 3, annular channel 4, and liner disc 5 inserted therein, is shown on container 6 preparatory to the sealing operation with pressure block 7 and knock-out plunger 8 contacting the end 1 and channel 4 and with thread-forming roller 9 in its non-operating position. In the sealing operation, pressure block 7 and container 6 are moved relative to one another, creating a pressure on the blank at channel 4 whereby the edge of liner 5 and the metal comprising channel 4 are drawn downwardly over the side of the container to form a top and side seal 10 and 11, respectively, and annular rib 12, as shown in Fig. 2. It will be appreciated that the final shape of rib 12 is determined by the contour 13 of pressure block 7. During the relative movement of the pressure block and the container, a plurality of forming rollers 9, only one of which is shown in the figures above referred to, revolve bodily around the closure blank and advance toward skirt 2. When relative movement of pressure block 7 and the container toward one another is nearly completed, the rollers contact the skirt and, as they revolve around the skirt, form threaded indentations 14 therein, conforming to threads 15 of the container finish. The closure as applied by the foregoing operation is shown in Fig 2 wherein pressure block 7 and thread-forming rollers 9 have not been retracted following the operation.

Figure 3:
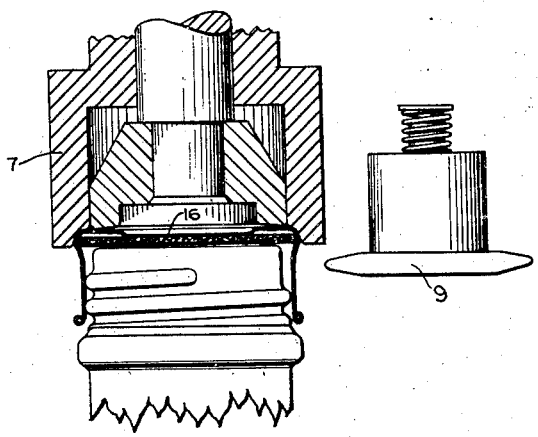
Fig. 3 is a view similar to Fig. 1 of a modified form of closure.
Figure 4:
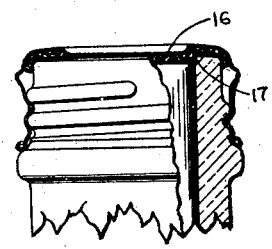
Fig. 4 is a view of the closure of Fig. 3 after application, the closure and a portion of the container finish being shown in cross section.

In Fig. 3 a closure blank is shown in position on a container preparatory to the sealing operation. Here, while the sealing operation performed is substantially the same as that embraced in Figs. 1 and 2, a blank is provided with a panel shown at 16. The principal advantages of this modification over the one shown in Figs 1 and 2 lie in the somewhat greater sealing surface contacted by the liner, and in the pressure created between the liner and the corner of the mouth of the container at 17 as best shown in Fig. 4.

My sealing apparatus consists of hollow pressure block 7 and knock-out plunger 8 mounted therein and yieldably supported by shaft 18. Pressure block 7, the internal diameter of which at the forming end is somewhat larger than the outside diameter of the container finish, is machined to provide surface 13 for contacting and reforming a closure blank. Plunger 8 is urged downwardly by spring 19 to provide sufficient pressure to hold a closure blank on a container as it enters the sealing mechanism and to eject a closure after it has been applied to a container.

Figure 5:
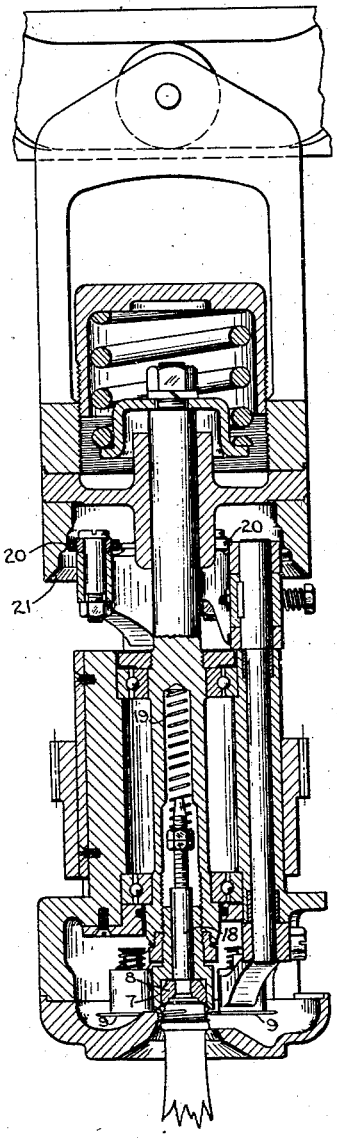
Fig. 5 is a vertical cross section of the sealing apparatus showing a container neck and closure in the sealing position.
Figure 6:
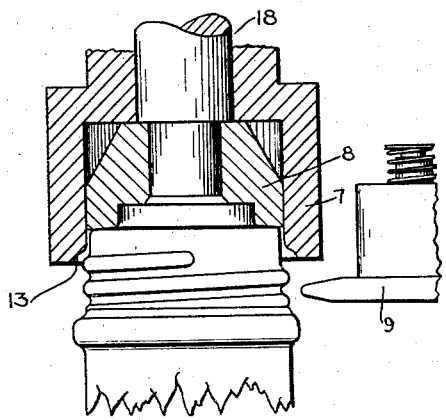
Fig. 6 is a view showing the pressure block and a container neck without a closure thereon in the sealing position.

In Fig. 5, my sealing apparatus is shown mounted in the general type of sealing mechanism disclosed by United States Patent 1,674,266 to J. E. Sharp. In the operation of this mechanism, when a container is presented to the sealing position, pressure block 7 engages the top of the blank and cam rollers 20 travel vertically on the generally frustum shape cam surface 21, causing rollers 9 to engage the skirt of the blank and to spin threads thereon corresponding to the threads on the container finish. If during the operation a container is presented to the sealing head without a closure blank, the same sequence of operation above described is performed, but with the improved pressure block of the present invention the container slips within the pressure block, as shown in Fig. 6. In this instance, rollers 20 do not proceed upwardly on cam surface 21 as far as when a container on which a blank has been placed is presented, and consequently rollers 9 do not contact the container.

Throughout the specification the description of my invention has been principally directed to the formation of tight seals with closures having liners of pulp board and like materials. Reference to these materials, however, has been only for the purpose of illustration and is in no way intended as a limitation on my invention, other more compressible and elastic materials, such as cork and rubber, being entirely suitable in practicing my invention.

I claim:

1. A method of sealing containers having an externally threaded finish and a side sealing surface with a plain skirted metallic closure blank having an annular bulge formed between said skirt and the closed end of said blank and having an oversize liner disposed therein, comprising pressing the overhanging margin of said liner into engagement with said side sealing surface by bending a portion of said blank in contact with said margin downward past the container mouth, and simultaneously therewith reforming said bulge into an annular rib adjacent the margin of said liner, and thereafter spinning threads in said skirt to conform to the threads disposed on said container finish.

2. A method of sealing containers having an externally threaded finish and a side sealing surface with a plain skirted metallic closure blank having an annular bulge formed between said skirt and the closed end of said blank and having a flat oversize liner of non-resilent material disposed therein, comprising pressing the overhanging margin of said liner into engagement with said side sealing surface by bending a portion of said blank in contact with said margin downward past the container mouth, and simultaneously reforming said bulge into an annular rib adjacent the margin of said liner by the application of pressure to the top of said annular bulge, and thereafter spinning threads in said skirt to conform to the threads disposed on said container finish.

3. In a method of sealing containers having a side sealing surface with a skirted metallic closure blank having an annular bulge formed between said skirt and the closed end of said blank, and having an oversize liner disposed therein, the steps comprising pressing the overhanging margin of said liner into engagement with said side sealing surface by bending a portion of said blank in contact with said margin downward past the container mouth, and simultaneously therewith reforming said bulge into an annular rib adjacent to the margin of said liner.

ANDREW G. OSBORNE.